United States Patent [19]

Kautz

[11] Patent Number: 5,015,818
[45] Date of Patent: May 14, 1991

[54] MAGNETIC COLLECTOR FOR FTM LASER WELD DEBRIS AND METHOD

[75] Inventor: Allan D. Kautz, Naperville, Ill.

[73] Assignee: Zenith Electronics Corporation, Glenview, Ill.

[21] Appl. No.: 292,196

[22] Filed: Dec. 30, 1988

[51] Int. Cl.$^5$ .............................................. B23K 26/00
[52] U.S. Cl. ........................... 219/121.63; 219/121.84
[58] Field of Search ..................... 219/121.63, 121.64, 219/121.68, 121.69, 121.67, 121.72, 121.84, 124.34

[56] References Cited

U.S. PATENT DOCUMENTS

3,626,145 12/1971 Jackson ....................... 219/124.34 X
3,701,881 10/1972 Rother et al. ................. 219/121.5 X
4,447,701 5/1984 Brown .......................... 219/121.84 X Primary Examiner—C. L. Albritton

[57] ABSTRACT

A magnetic collector disposed about the nozzle of a laser used for welding and severing a steel foil tension mask (FTM) in a color cathode ray tube (CRT) removes debris produced during laser welding and cutting. A plurality of magnets are mounted to a soft iron ring disposed about the laser beam exit aperture and are positioned in close proximity to the FTM and its support rail during laser welding and cutting. The magnets may be arranged with like poles disposed about the laser beam exit aperture or with the magnetic poles arranged in an alternating manner, which latter arrangement provides somewhat broader magnetic field coverage, for collecting and preventing small metallic particles produced during welding and cutting from becoming attached to and obstructing the apertures in the FTM.

23 Claims, 4 Drawing Sheets

MAGNETIC COLLECTOR FOR FTM LASER WELD DEBRIS AND METHOD

CROSS REFERENCE TO RELATED APPLICATIONS

This application is related to but in no way dependent upon any of the following applications which are assigned to the assignee of the present application, with the disclosures of these applications hereby incorporated by reference in the instant application: Ser. No. 058,095, filed June 4, 1987; Ser. No. 138,994, filed Dec. 29, 1987; and Ser. No. 140,070, filed Dec. 31, 1987.

BACKGROUND OF THE INVENTION

This invention relates generally to the manufacture of cathode ray tubes (CRTs) and is particularly directed to an improved arrangement and method for incorporating a foil tension mask (FTM) in a color CRT by laser welding.

Recent developments in the area of CRTs have led to the use of shadow masks of the tension foil type in combination with a substantially flat faceplate. CRTs having a flat glass faceplate in combination with an FTM are used in home entertainment television receivers as well as in medium- and high-resolution tubes used as color monitors. Among the various advantages of CRTs using an FTM is an increased power handling capacity permitting as much as a 3-fold increase in display brightness. By maintaining the foil mask, under high mechanical tension in a stretched condition, the FTM does not thermally expand, or dome, under local heating caused by increased electron beam intensities which allow for increased display brightness. By preventing the doming of the FTM, the foil is securely maintained in fixed spaced relation from the faceplate to ensure that the FTM remains in precise alignment within the phosphor dot array on the inner surface of the faceplate.

The stretched FTM is securely mounted to a support frame positioned on or adjacent to the CRT's faceplate. The support frame must be of high strength so as to hold the FTM immovable and maintain it in a highly stretched condition. A tension in the range of 20–40 kpsi is typically applied across the stretched FTM. The FTM is typically affixed to the support frame by welding. U.S. patent application Ser. No. 058,095, cross-referenced above and assigned to the assignee of the present application, discloses means for securing a tension mask to a faceplate-mounted, frame-like shadow mask support structure by laser weldments. U.S. patent applications Ser. Nos. 138,994 and 140,070, also cross-referenced above and assigned to the assignee of the present application, disclose two different means and methods for mapping an FTM receiving surface of a mask support structure for delineating the path of an attachment device such as a laser welding head for permanently affixing an FTM to the support structure. Metallic debris is an unwanted by-product of the welding operation. Even more metallic debris is generated upon severing the FTM from an in-process FTM blank following welding of the FTM to its support structure. The thus produced loose metallic particles tend to land on the FTM, where they can become attached as by lodging in a mask aperture. Obstruction of the mask apertures would, of course, result in video image degradation.

The present invention is intended to eliminate this source of video image degradation by removing the metallic particles produced during FTM welding and cutting. By removing the debris as it is produced during FTM welding and cutting, the metallic particles are prevented from becoming attached to the FTM and blocking its electron beam transiting apertures. By thus maintaining the FTM installation environment essentially free of contaminants, high quality video imagery of the color CRT is ensured.

OBJECTS OF THE INVENTION

Accordingly, it is an object of the present invention to provide an improved method and means for incorporating an FTM in a color CRT.

It is another object of the present invention to prevent debris produced during attachment of an apertured FTM to a support structure in a color CRT from becoming attached to or lodged in the apertures of the FTM.

Yet another object of the present invention is to improve quality control in the manufacture of CRTs by removing contaminants produced during installation of the CRT's foil tension mask by laser welding.

A further object of the present invention is to provide a single mechanism for welding a foil tension shadow mask to a support structure in a CRT, severing the foil tension shadow mask from an in-process shadow mask blank, and collecting and removing from the CRT metallic debris produced by the welding and cutting operations.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1a is a perspective view of a magnetic debris collector for a laser welder in accordance with the present invention;

FIG. 1b is a lateral view, shown partially in section, of the magnetic debris collector shown in FIG. 1a;

DETAILED DESCRIPTION OF THE PREFERRED EMBODIMENT

Figures 1A, 1B:
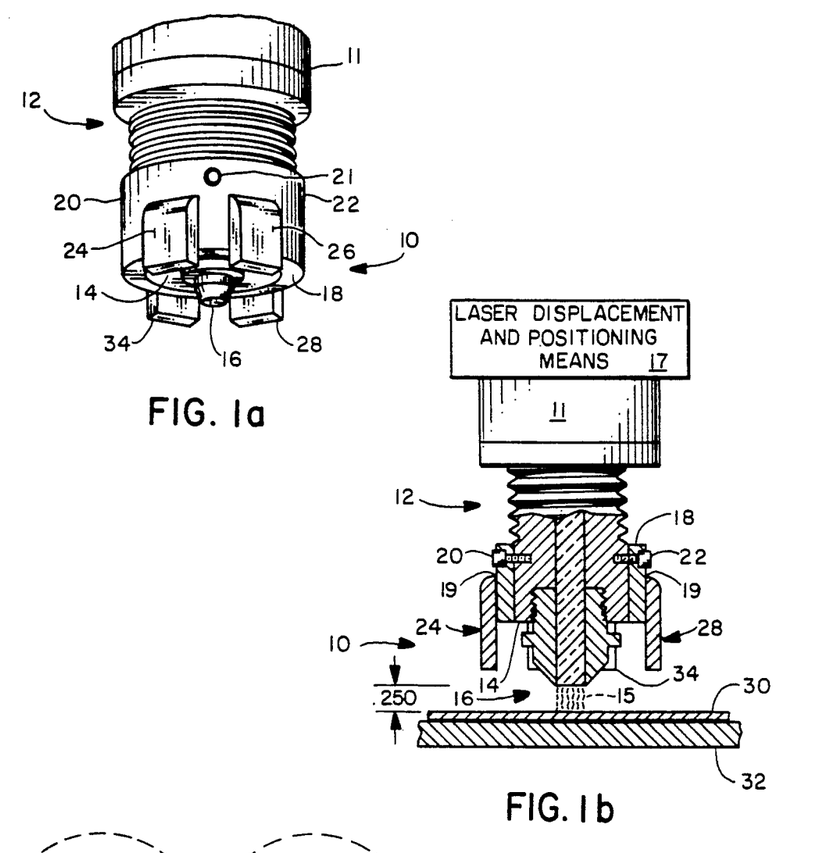

Referring to FIG. 1a, there is shown a perspective view of a magnetic debris collector for a laser welder 12 in accordance with the present invention. FIG. 1b is a lateral view shown partially in section of the magnetic debris collector 10 of FIG. 1a. The laser welder includes a generally cylindrical housing 11 through which a laser beam is directed. The laser used in a preferred embodiment of the present invention for welding and severing an FTM 30 is a 600 watt Model 810 carbon dioxide laser capable of being operated in either a pulsed mode for welding the FTM or in a continuous-wave mode for severing the FTM. The manufacturer of the Model 810 is Spectra Physics, Inc., of San Jose, Calif. However, the present invention is not limited to the use of this particular laser, as other lasers and related equipment offered by other manufacturers may as well be used with the magnetic collector 10 of the present invention.

The laser welder 12 includes an end fitting 14 disposed on the distal end of a cylindrical housing 11. Extending from the distal end of the laser end fitting 14 is a laser nozzle 16 having an aperture therein through which the laser beam 15 is directed. The laser beam is incident upon a thin (on the order of 0.001 inch thick, or less) FTM 30 positioned on a support rail 32. The FTM 30 is preferably comprised of an aluminum-killed (AK) steel such as AISI 1005 cold-rolled capped steel. The material of the support rail 32 preferably comprises a metal alloy having a coefficient of thermal expansion (CTE) compatible with he CTE of the glass of a faceplate (not shown) to which the support rail is attached. A suitable material is a nickel-chrome alloy, Carpenter Alloy No. 27, manufactured by Carpenter Technology, Inc., of Reading, Pa. The laser welder 12 is operated in a pulsed mode for welding the FTM 30 to the support rail 32 and is operated in a continuous mode, after being displaced outward from the weldments around the support rail, for separating the FTM from its in-process blank which is coupled to and maintained in a tightly stretched condition by a generally rectangular factory fixture frame which is not shown in the figure for simplicity. The laser beam 15 causes localized melting of the FTM 30 and support rail 32 which become fused together when the laser beam is removed.

Coupled to the laser welder 12 is laser displacement and positioning means 17 which controls the operation and positioning of the laser beam relative to the FTM 30 in the support rail 32. As disclosed in the aforementioned Ser. No. 138,994 patent application, the laser displacement and positioning means 17 in a preferred embodiment includes an Allen-Bradley Company Model 2805 EXPERT Programmable Vision System for measuring the location of the support rail 32. This Allen-Bradley system maps images using a technique known in the art of image recognition systems as "contour extraction". Also disclosed therein for use in a preferred embodiment of the laser displacement and positioning means 17 is an Allen-Bradley Series 8200 CNC control unit for operating an X-Y positioner for displacing the laser welder 12 in combination with an optical camera arrangement for precise positioning of the laser welder.

Disposed about the laser welder's end fitting 14 is an annular steel collar 18. The steel collar 18 is securely maintained in position and coupled to the laser end fitting 14 by means of four threaded mounting pins, with only three of these mounting pins shown in the figures and identified as elements 20, 21 and 22. The mounting pins 20, 21 and 22 allow the collar 18 to be easily positioned upon and removed from the laser end fitting 14. A plurality of magnets 24, 26 and 28 are mounted to the collar 18 about its periphery in a spaced manner. A fourth magnet 34 is shown mounted to the collar 18 in the planar views of the collar and magnets shown in FIGS. 2a and 2b. The magnets are preferably powerful rare-earth magnets disposed symmetrically about the collar 18. The collar 18 is preferably comprised of a mild steel high in iron content to support a high strength magnetic field about the laser nozzle 16. The laser nozzle 16 is preferably comprised of brass so as to not affect the magnetic field thereabout. The four magnets 24, 26, 28 and 34 are affixed to the collar 18 by conventional means such as an epoxy cement 19 and are positioned on the collar so as to be spaced approximately ¼ inch above the work surface defined by the FTM 30 to prevent interference with the FTM 30 as it is welded and cut. Each of the magnets is shown generally rectangular in shape, although the magnets may take on virtually any shape or configuration provided they are positioned about the laser beam 15 and in close proximity to the welded portions of the FTM 30 and support rail 32. In a preferred embodiment, the magnets produce a magnetic field on the order of 15 gauss at a distance of approximately ½ inch from the magnets.

Figure 2A:
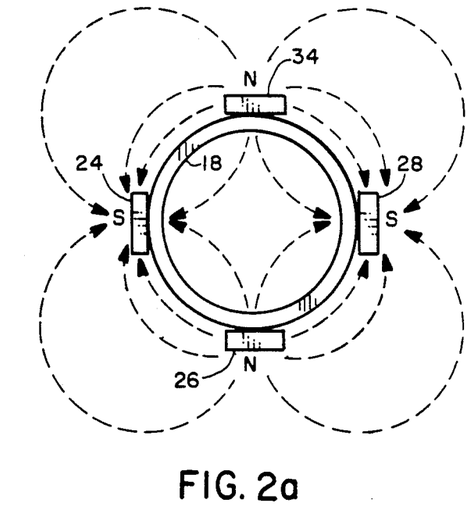
FIGS. 2a and 2b respectively show alternating and similarly aligned pole arrangements of the magnets used in the metallic debris collector used in combination with a laser welder in accordance with the present invention.
Figure 2B:
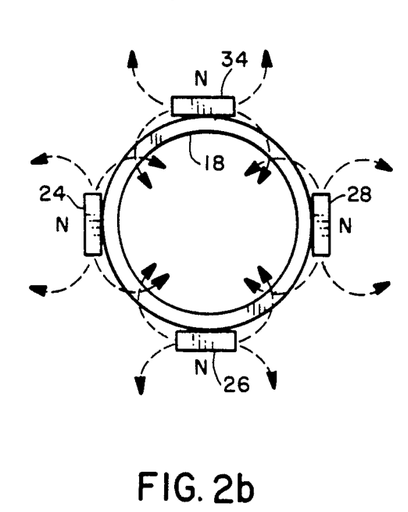
Figure 3A:
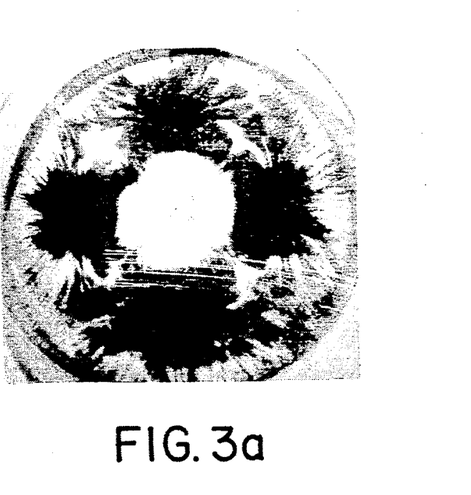
FIGS. 3a and 3b show the magnetic field of four magnets with similarly aligned polarities symmetrically arranged about a laser nozzle in accordance with the present invention.
Figure 3B:
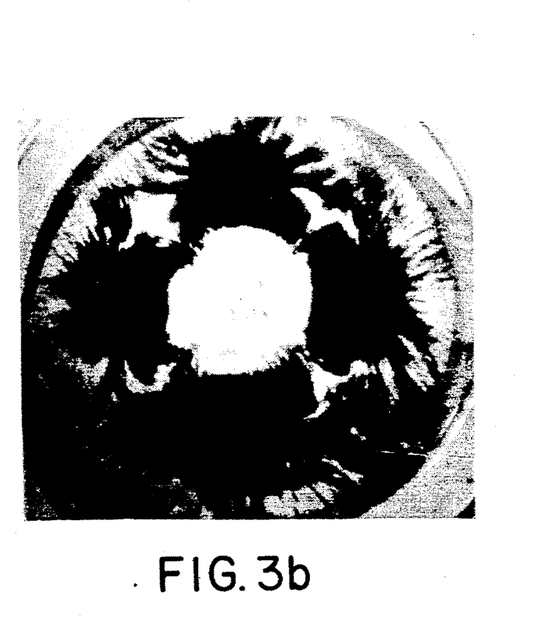
Figure 4A:
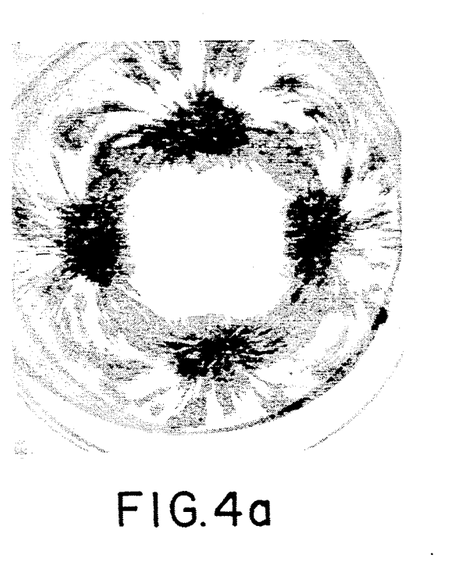
FIGS. 4a and 4b show the magnetic field of four magnets with alternating polarities symmetrically arranged about a laser nozzle in accordance with the present invention.
Figure 4B:
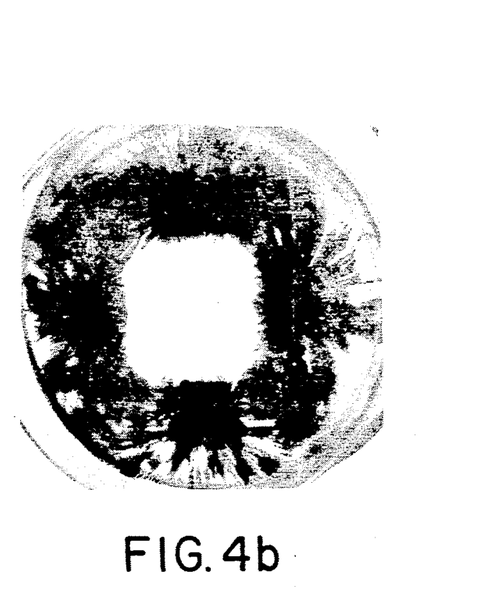
Figure 5A:
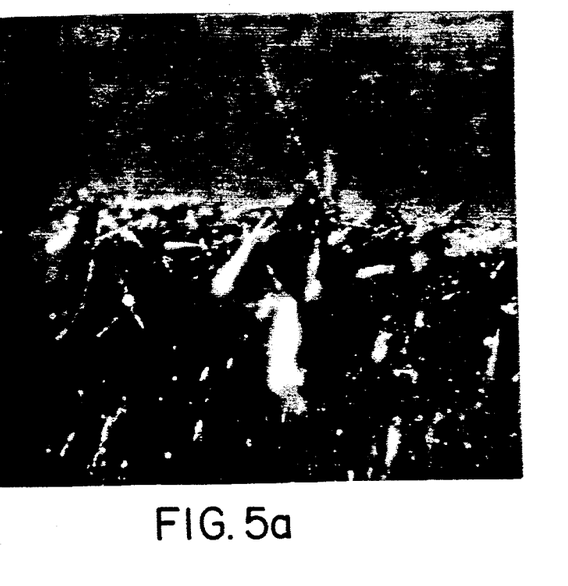
FIGS. 5a through 5f show a series of microscopic photographs illustrating the types of metallic particles removed from an in-process CRT following FTM laser welding and cutting by a magnetic collector in accordance with the present invention.
Figure 5B:
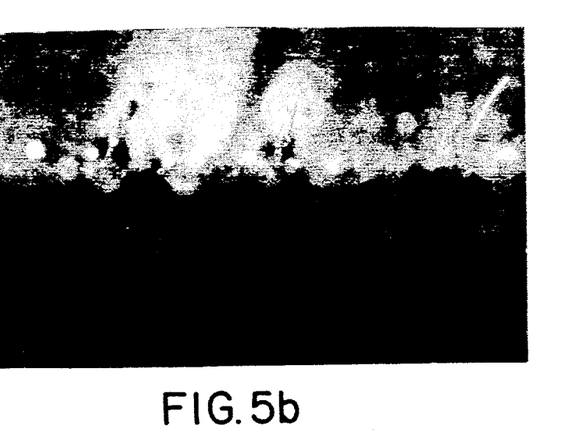
Figure 5C:
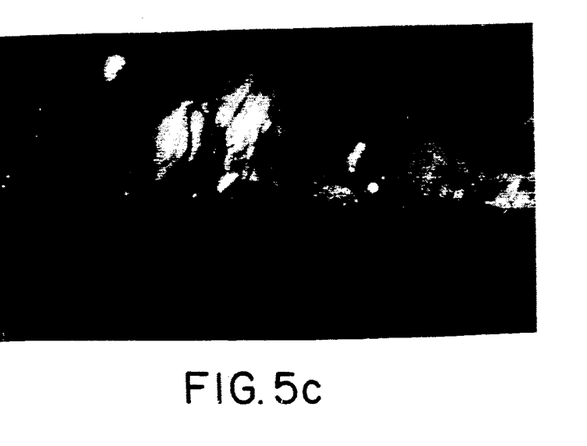
Figure 5D:
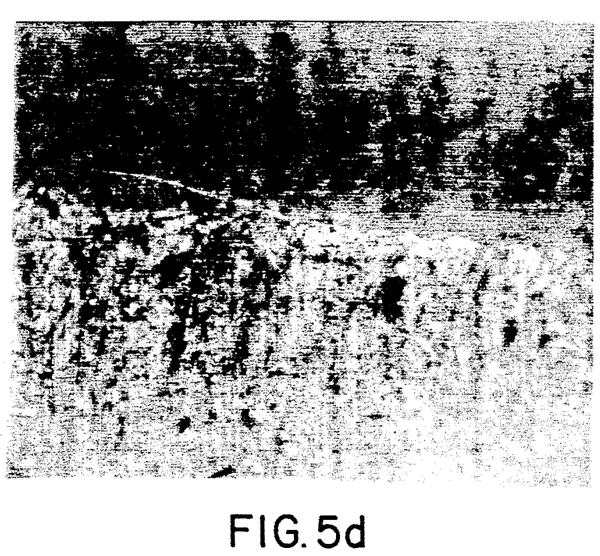
Figure 5E:
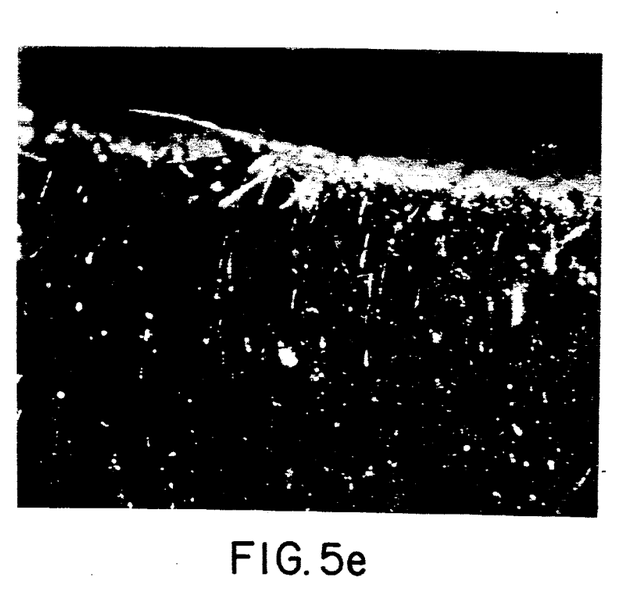
Figure 5F:
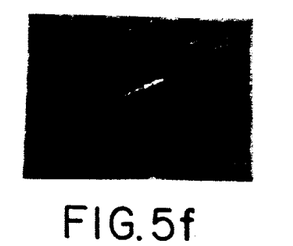

The present invention contemplates arranging the magnets in an alternating pole configuration as shown in FIG. 2a as well as in an arrangement where the magnetic poles are similarly aligned as shown in FIG. 2b. The resulting magnetic field is shown by the dotted lines for the alternating pole arrangement of FIG. 2a and the similarly aligned pole arrangement in FIG. 2b. FIGS. 3a and 3b illustrate photographs of magnetic field mapping for the similarly aligned pole arrangement shown in in FIG. 2b, where magnetic field mapping is provided by iron filings aligned with the magnetic field. FIGS. 4a and 4b illustrate the magnetic field configuration for the alternating magnetic pole arrangement shown in FIG. 2a, where magnetic field mapping is again plotted using iron filings. From the photographs shown in FIGS. 3a, 3b, 4a and 4b, it appears that the alternating pole configuration of FIG. 2a provides a somewhat broader field coverage of the area about the laser welder nozzle. The alternating pole arrangement of FIG. 2a was installed on a laser and the magnetic debris collector successfully collected the types of metallic particles produced during laser welding and cutting. The debris produced during laser welding and cutting was found to be symmetrically disposed about the location of incidence of the laser beam on the FTM.

Referring to FIGS. 5a through 5f, there are shown photographs taken with the aid of a microscope illustrating the types of metallic particles collected during operation of the magnetic debris collector of the present invention. Most of the collected particles are whisker-like mask slivers and spherical weld splashes. The metallic mask slivers range in size up to approximately 50 mils in length, while the weld splashes range up to approximately 4 mils in diameter. The combination collar 18 and four magnets attached thereto may be periodically removed from about the laser nozzle 16 by loosening the threaded mounting pins 20, 21 and 22 to allow for removal of the collected metallic debris. The metallic debris is removed from the magnets by brushing them with a stiff brush, with the thus loosened debris then vacuumed up to ensure proper disposal of this contaminant.

There has thus been shown a magnetic debris collector disposed about the nozzle of a laser welder for collecting metallic particles produced during installation of a foil tension mask in a color CRT. The magnetic collector includes a plurality of magnets disposed about the laser nozzle which attract and collect the metallic particles produced during welding and cutting of the foil tension mask. Collecting the thus produced metallic particles permits them to be removed from the CRT immediately after they are produced during CRT manufacture and precludes these metallic particles from becoming attached to the foil tension mask and lodged in its electron transiting apertures.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for securing a foil tension mask to a support structure for use in a color CRT and for collecting metallic debris produced during the securing of said foil tension mask, said apparatus comprising:
   a laser beam source for directing a laser beam onto the foil tension mask and welding the foil tension mask to the support structure; and
   magnetic means including a plurality of magnets disposed about said laser beam and adjacent to the foil tension mask where said laser beam is incident thereon for collecting the metallic debris produced during the securing of the foil tension mask to the support structure.

2. Apparatus for securing a foil tension mask to a support structure for use in a color CRT and for collecting metallic debris produced during the securing of said foil tension mask, said apparatus comprising:
   a laser beam source for directing a laser beam onto the foil tension mask and welding the foil tension mask to the support structure; and
   magnetic means disposed about said laser beam and adjacent to the foil tension mask where said laser beam is incident thereon for collecting the metallic debris produced during the securing of the foil tension mask to the support structure.

3. The apparatus of claim 2 comprising mounting means coupled to said laser beam source for symmetrically positioning said plurality of magnets about the laser beam.

4. The apparatus of claim 3 wherein said mounting means is removably attached to said laser beam source to permit said magnets to be removed from said laser beam source for removing the metallic debris from said magnets.

5. The apparatus of claim 4 wherein said mounting means included an annular ring symmetrically disposed about the laser beam.

6. The apparatus of claim 5 further comprising releasable coupling means for coupling said annular ring to said laser beam source.

7. The apparatus of claim 6 wherein said releasable coupling means includes at least one threaded mounting pin inserted through said annular ring and engaging said laser beam source.

8. The apparatus of claim 5 wherein said annular ring is comprised of a magnetic permeable material 9. The apparatus of claim 8 wherein said magnetic permeable material is a mild steel having high iron content 10. The apparatus of claim 2 wherein each of said magnets is a rare earth magnet.

11. The apparatus of claim 2 wherein each of said magnets has a north and a south pole and wherein the north and south poles of said magnets are arranged in an alternating manner around said laser beam and adjacent to the foil tension mask.

12. The apparatus of claim 2 wherein each of said magnets has a north and a south pole and the north pole of each of said magnets is disposed adjacent to the foil tension mask.

13. The apparatus of claim 1 wherein said laser beam source includes a non-magnetic nozzle through which said laser beam is directed.

14. The apparatus of claim 13 wherein said nozzle is comprised of brass.

15. The apparatus of claim 1 further comprising means for severing the foil tension mask from an in-process blank following securement of the foil tension mask to the support structure.

16. The apparatus of claim 15 wherein said means for severing the foil tension mask from an in-process blank is said laser beam.

17. A method for securing a metal foil tension mask to a metal support structure in a CRT comprising:
   directing a laser beam onto the foil tension mask disposed on the support structure so as to fuse the foil tension mask and the support structure in forming a weldment; and
   magnetically collecting and removing from said weldment metallic debris produced during the fusing of the foil tension mask and the support structure.

18. The method of claim 17 wherein the step of magnetically collecting and removing metallic debris includes positioning a plurality of magnets about the laser beam and adjacent to the weldment.

19. The method of claim 18 further comprising the step of symmetrically arranging the plurality of magnets about the laser beam.

20. The method of claim 18 wherein each of said magnets includes a north and a south pole, with said method further comprising the step of positioning the north pole of each of said magnets in close proximity to the foil tension mask.

21. The method of claim 18 wherein each of said magnets includes a north and a south pole, with said method further comprising the step of positioning the north and south poles of adjacent magnets in an alternating manner about the laser beam and in close proximity to the foil tension mask.

22. Apparatus for securing a foil tension mask to a support structure for use in a color CRT and for collecting metallic debris produced during the securing of said foil tension mask, said apparatus comprising:
   a laser beam source for directing a laser beam onto the foil tension mask, welding the foil tension mask to the support structure, and severing the foil tension mask from an in-process blank; and
   a plurality of magnets symmetrically disposed about said laser beam and positioned adjacent to the foil tension mask where said laser beam is incident thereon for collecting the metallic debris produced during the securing and severing of the foil tension mask.

23. Apparatus for securing a foil tension mask to a support structure for use in a color CRT and for collecting metallic debris produced during the securing of said foil tension mask, said apparatus comprising:
  a laser beam source for directing a laser beam onto the foil tension mask, welding the foil tension mask to the support structure, and severing the foil tension mask from an in-process blank; and
  a plurality of magnets symmetrically disposed about said laser beam and positioned adjacent to the foil tension mask where said laser beam is incident thereon for collecting the metallic debris produced during the securing and severing of the foil tension mask, wherein each of said magnets has a north and a south pole and wherein the north and south poles of adjacent magnets are arranged in an alternating manner.

* * * * *

UNITED STATES PATENT AND TRADEMARK OFFICE
CERTIFICATE OF CORRECTION

PATENT NO. : 5,015,818
DATED : May 14, 1991
INVENTOR(S) : Allan D. Kautz

It is certified that error appears in the above-identified patent and that said Letters Patent is hereby corrected as shown below:

Column 5, lines 25-49, claims 1 and 2 should read as follows:

--1. Apparatus for securing a foil tension mask to a support structure for use in a color CRT and for collecting metallic debris produced during the securing of said foil tension mask, said apparatus comprising:
    a laser beam source for directing a laser beam onto the foil tension mask and welding the foil tension mask to the support structure; and
    magnetic means disposed about said laser beam and adjacent to the foil tension mask where said laser beam is incident thereon for collecting the metallic debris produced during the securing of the foil tension mask the support structure.

2. Apparatus for securing a foil tension mask to a support structure for use in a color CRT and dor collecting metallic debris produced during the securing of said foil tension mask, said apparatus comprising:
    laser beam source for directing a laser beam onto the foil tension mask and welding the foil tension mask to the support structure; and
    magnetic means including a plurality of magnets disposed about said laser beam and adjacent to the foil tension mask where said laser beam is incident thereon for collecting the metallic debris produced during the securing of the foil tension mask to the support structure.--.

UNITED STATES PATENT AND TRADEMARK OFFICE
CERTIFICATE OF CORRECTION

PATENT NO. : 5,015,818

DATED : May 14, 1991

INVENTOR(S) : Allan D. Kautz

It is certified that error appears in the above-identified patent and that said Letters Patent is hereby corrected as shown below:

Column 6, claim 13, line 17, change "claim 1" to read --claim 2--.
Column 6, claim 15, line 22, change "claim 2" to read --claim 1--.

Signed and Sealed this

Ninth Day of June, 1992

*Attest:*

DOUGLAS B. COMER

*Attesting Officer*   Acting Commissioner of Patents and Trademarks